July 28, 1936.    F. V. WALTZ    2,049,282
WEIGHING SCALE
Filed Sept. 16, 1935    2 Sheets-Sheet 2
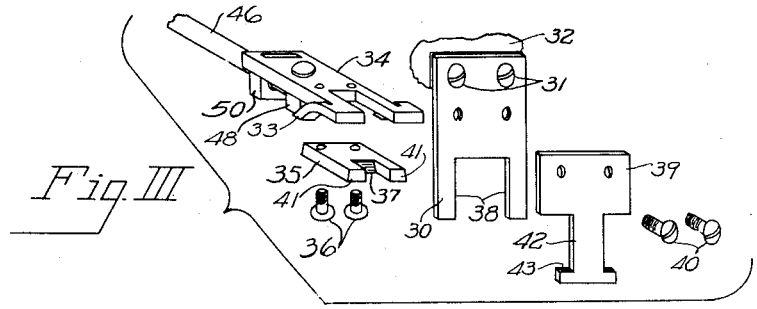
Fig. III
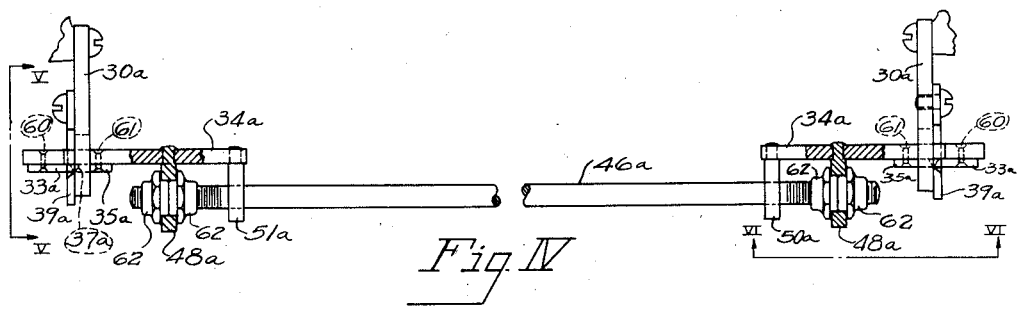
Fig. IV
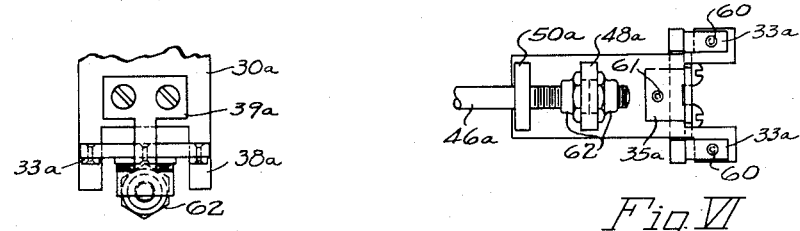
Fig. V
Fig. VI
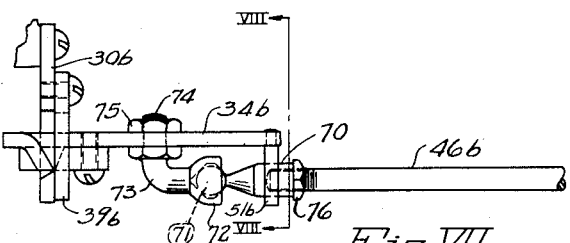
Fig. VII
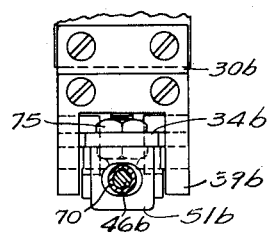
Fig. VIII
Foster V. Waltz
INVENTOR
BY *B.O. Marshall*
ATTORNEY Patented July 28, 1936

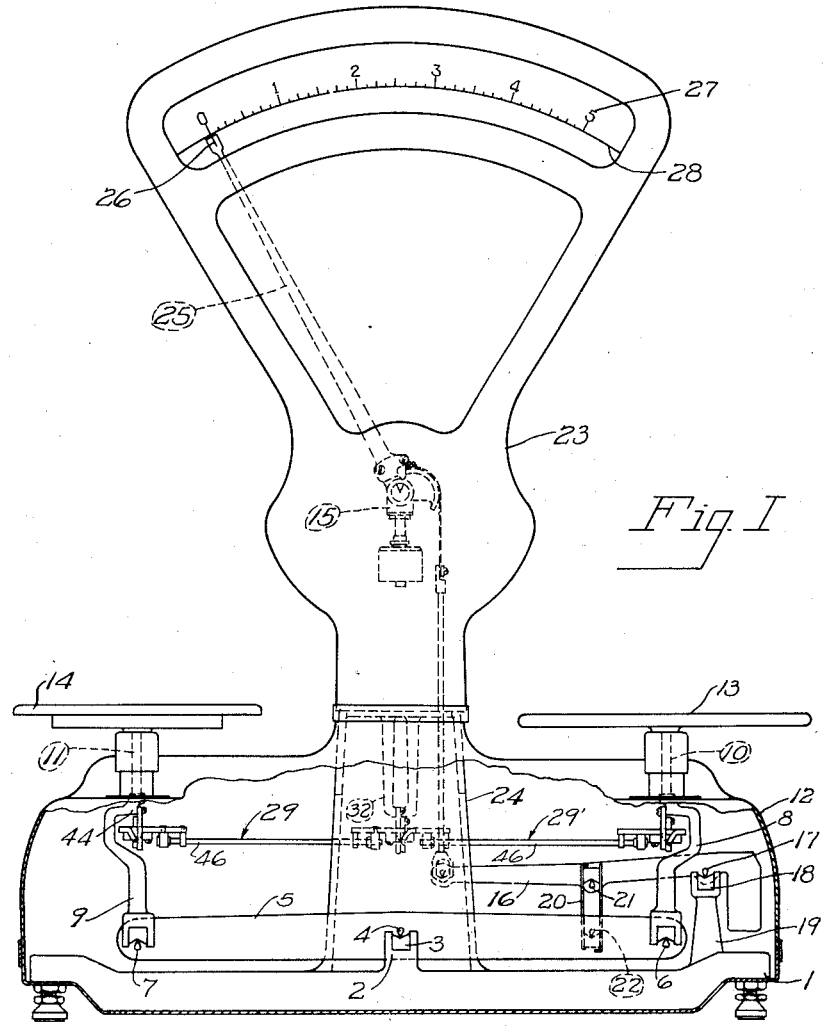
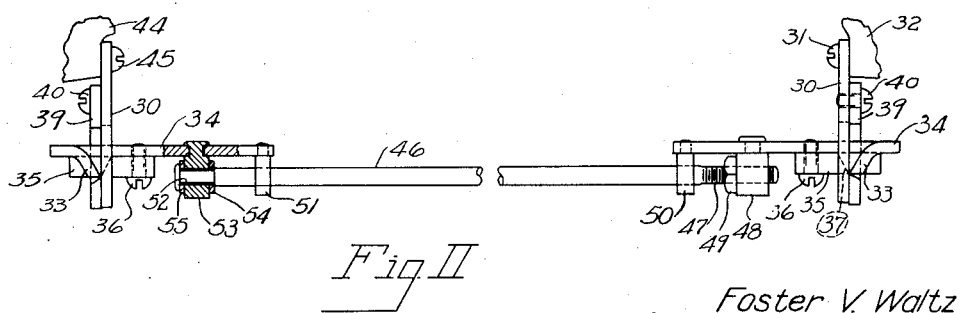

2,049,282

UNITED STATES PATENT OFFICE 2,049,282

WEIGHING SCALE

Foster V. Waltz, Toledo, Ohio, assignor to Toledo Scale Manufacturing Company, Toledo, Ohio, a corporation of New Jersey Application September 16, 1935, Serial No. 40,733

3 Claims. (Cl. 265—27)

This invention relates generally to weighing scales and more particularly to check links employed in such scales for the purpose of parallelly guiding the load receiving mechanism.

The principal object is the provision of an improved check link which may be accurately and inexpensively constructed.

Another object is the provision of an improved check link which is capable of readily aligning itself to meet slight "out of line" positions of scale parts.

These, and other objects and advantages will be apparent from the following description in which reference is had to the accompanying drawings, wherein similar reference characters refer to similar parts throughout the several views.

Referring to the drawings:—

Figure I is a front elevational view of a scale, showing a preferred construction of an improved check link embodying my invention.

Figure II is an enlarged fragmentary side elevational view of the check link, parts being broken away.

Figure III is a perspective view which shows in detail the relation of the parts entering the engaging ends of the check link assembly.

Figures IV, V and VI are side, end and plan views respectively of a modification of my improved check link; and, Figures VII and VIII show respectively a side and end view of still another modification.

Referring to the drawings in detail:—

The preferred embodiment of the check link which is hereinafter fully described, and its modifications is not limited to any particular type of scale; and the scale shown in the drawings is for illustrative purposes only.

The scale comprises a base 1, which is preferably a rigid casting having upwardly extending bosses 2 having bifurcated end, which carry bearings 3, preferably made from hard polished anti-friction material, such as agate, upon which fulcrum pivot 4 are mounted. These fulcrum pivots 4 are fixed in the sides of a main lever 5 and form the axis about which the lever oscillates when subjected to a load. The lever 5 is also provided with load supporting pivots 6 and counterpoise supporting pivots 7 upon which rest load receiving frame 8 and counterpoise receiving frame 9 respectively.

Upon rod-like extensions 10 and 11, which are fixed in the upper portion of the frames 8 and 9 respectively, and which project through suitable openings in a base casing 12, which rests on the base 1, the load receiving platter 13 and counterpoise platter 14 are mounted. The casing 12 serves to house and protect all the parts which are mounted upon the base 1.

For the purpose of transmitting the force occasioned by a load placed on either of the platters 13 and 14, to a counterbalancing pendulum 15, an auxiliary lever 16 is provided. This auxiliary lever 16 is provided with fulcrum pivots 17 which rest in V grooved bearings 18 fixed in an upwardly extending fulcrum bracket 19 securely mounted on the base 1 in close proximity to the end of the lever 5. The lever 16 is operatively connected to the lever 5 by a link 20 which engages pivots 21 and 22 extending from the sides of the levers 16 and 5 respectively.

The load counterbalancing pendulum 15 is oscillatably mounted in the interior of an indicating housing 23 mounted on a tripod-like frame 24 which extends upwardly from the base 1. An indicator 25, secured to the pendulum 15, partakes of its movement and an index 26 printed or etched on a flat face cooperates with indicia 27 printed on a chart 28 fixed in the housing 23, to indicate the condition of balance.

To maintain the condition of level of the load receiver 13 and the counterpoise receiver 14, according to the "Roberval" principle, check links 29 and 29[1] are provided. These check links, for example check link 29, in which my invention resides, comprises a "pull" check block 30 (see Figures II and III) which is securely fastened by means of screws 31 to a flat face of an arm 32 which extends downwardly from the upper portion of the tripod-like frame 24. The outer face of the "pull" check block 30, which is made of hardened steel and ground smoothly, is engaged by knife edges 33 forming a part of "pull" knife block 34.

The knife edges 33 are formed integrally by partially slitting portions of the edges of the block 34 and bending them downwardly at a predetermined angle, then by cutting them off at the proper length and angle and holding the block on a magnetic chuck of a surface grinder, the sharp knife edges may be economically and accurately ground.

A "push" knife block 35 is adjustably secured by screws 36 to the lower face of the block 34. This "push" knife block 35 is of such thickness that an angularly milled portion forms a knife edge 37 on the lower edge of the block so that this edge when assembled and adjusted to the block 34 is in coincidence with the edges of the knives 33. When assembling this end of the check link 29 to the stationary arm 32, as hereinbefore referred to, the knife edges 33 of the block 34 engage extensions 38 of the "pull" check block 30; the knife edge 37 of the "push" knife block 35 engages the face of a "push" check block 39 which is fastened to the "pull" check block 30 by means of screws 40. When the portion is milled out of the block 35 to form the knife edge 37, arms 41 remain. These arms substantially embrace a narrow portion 42 of the "push" check block 39 and their lower faces rest on knife edges 43 which are formed on the "push" check block 39 thus supporting the end of the check link 29 at a fixed predetermined level. The "push" and "pull" contact members of the opposite end of the check link 29 are identical with those just described, however, when assembled in the scale the "pull" check block 30 of the opposite end is secured to the flat face of a projection 44 on the counterpoise receiving frame 9 by means of screws 45. The two ends whose members form the engaging portions of the check link are connected by means of a rod 46. An end 47 of this rod is threaded into a block 48 which is rotatably riveted to the pull check block 34 and is locked in adjusted position by a nut 49.

For the purpose of limiting a sidewise motion of the rod 46 relative to the end of the check link 29 about the axis formed by the block 48, a guide 50 is riveted to the block 34. An elongated aperture is provided in this guide through which the rod 46 passes. The vertical dimension of this aperture is just sufficient to clear the diameter of the rod 46, but the horizontal dimension is slightly greater, thus permitting only the desired motion. To allow the other end of the check link to rotate about the longitudinal axis of the rod 46 so that it may align itself to the relatively movable scale parts without binding, the end 52 of the rod 46 is turned to a smaller diameter. This end 52 after passing through an elongated aperture in a guide 51 projects through a hole in a block 53, which is riveted to the pull check block 34 so that it may swivel about its axis.

A washer 54 is interposed between the shoulder formed by the turned down portion 52 and the face of the block 53, a similar washer 55 is situated on the turned down portion 52, between the opposite face of the block 53 and the riveted head of the rod 46. This riveting operation must be carefully performed so that the pull check block 34 may freely turn about the longitudinal axis of the rod 46, but permit no end play.

Check link 29¹ which parallelly guides the load receiver 13 and its supporting parts is identical in construction with the check link 29 hereinbefore described and further description is deemed unnecessary.

The operation of check links is well known in scales of the "Roberval" type. In the scale shown and described, when a load is placed on the counterpoise receiver 14, adjacent the edge opposite the housing 23, a force is set up which tends to turn the receiver 14 and its support 9 about the axis of the counterpoise pivot 7 of the lever 5, in an anticlockwise direction, actual motion, however, is prevented by the check link 29. The pivots 33 on the "pull" edge check blocks 34 contact the extensions 38 (Figure III) of the pull check blocks 30 fastened to one of the arms 32 and to the projection 44 of the counterpoise receiver 9 and hold the checked members stationary.

When the weight is placed on the opposite side of the platter, that is adjacent the housing 23, a force tending to turn the counterpoise receiver in a clockwise direction is set up. Such turning force is resisted by the pivots 37 which are contacting the inner face of the push check block 39, which is fastened to the outer face of the pull check block 30. Since the faces of the blocks which are engaged by the pivots 33 lie in a vertical plane and the edges of the pivots are constantly in engagement with the faces of the blocks there is no lost motion, and the condition of level of the counterpoise receiver is constantly maintained throughout the entire angular movement of the lever on which the receiver is mounted, it being understood that the distance between the contact edges of the check link is equal to the pivot distance of the lever.

To prevent binding of the check link when the knife edges 43 of the push check block 39, upon which the check link rests, are slightly out of alignment I have provided the means hereinbefore described to permit one of the contact ends to swivel about the axis of the rod 46; thus means are provided whereby the check link may adjust itself to any alignment of the scale parts.

The modified construction of the embodiment of my invention as shown in Figures IV, V and VI comprises "push" check blocks 39a, "pull" check blocks 30a and a pull edge block 34a. Knife edges 33a in this embodiment are secured to the block 34a by means of a pintle 60 so that they may align themselves to the face of the extensions 38a of the pull check block 30a. In a similar manner a "push" knife edge block 35a is secured by a pintle 61 permitting the knife edge 37a to align itself with the face of the push check block 39a. The edges of the pivots 33a and 35a are in coincidence similarly to the edges described in the preferred embodiment. Since in this embodiment the knife edges which contact the stationary blocks are capable of aligning themselves, in this modification, the block 48a is rigidly riveted to the block 34a and the guides 50a and 51a have a circular aperture instead of an elongated aperture in the preferred embodiment. The connecting rod 46a, which passes through the aperture of the blocks 48a, 50a and 51a, has threaded thereon, adjacent its ends two pairs of lock nuts 62. These lock nuts have tenons which enter the aperture of blocks 48a, the length of the tenons being such that when the nuts 62 are tightened against each other the blocks 48a, while held against longitudinal movement on the rod it may turn about the axis of the rod permitting the check link to align itself with the supporting pivots 43a of the "push" check block 39a. It will be seen that substantially the same effect is had by this construction as by the preferred embodiment described hereinbefore.

Another modification is shown in Figures VII and VIII. The blocks 39b, 30b and 34b are identical with those employed in the preferred embodiment and their functions are also similar. The connecting rod 46b is threaded into a member 70 having a ball shaped end 71, which projects into a conical socket 72 in an angular member 73 having a threaded tenon 74 which projects through the block 34b and is clamped thereto by nut 75. The wall surrounding the conical socket after the introduction of the ball is spun over sufficiently to retain the ball in the socket, freely without binding. A cylindrical portion of the member 70 projects through a slightly elongated aperture in the guide 51b which limits relative movement between the contact end of the check link and the connecting rod 46b. The rod 46b after being threaded into the member 70 is locked by a nut 76. It will be seen that this modification also provides all the necessary adjustments to align the check link with the other member, similar to the preferred construction of the embodiment hereinbefore described.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of class described, in combination, weighing mechanism, a check link adapted to control the movement of at least one member of said weighing mechanism, said check link comprising ends having knife edges adapted to engage bearings, said knife edges being capable of alignment to said bearings and a connection between said ends, said connection having means whereby said knife edges may be maintained in engagement with said bearings when said check link is subjected to tensile or compressive forces and said maintaining means comprising universal joints between at least one of said check link ends and said connecting means.

2. In a device of the class described, in combination, weighing mechanism, a check link adapted to control the movement of at least one member of said weighing mechanism, said check link comprising ends having knife edges adapted to engage bearings, said knife edges being capable of alignment to said bearings and a connection between said ends, said connection having means whereby said knife edges may be maintained in engagement with said bearings when said check link is subjected to tensile or compressive forces, said maintaining means comprising universal joints between at least one of said check link ends and said connecting means and said universal joint comprising a socket and a spherical member held therein.

3. In a device of the class described, in combination, weighing mechanism, a check link adapted to control the movement of at least one member of said weighing mechanism, said check link comprising ends having knife edges adapted to engage bearings, said knife edges being capable of alignment to said bearings and a connection between said ends, said connection having means whereby said knife edges may be maintained in engagement with said bearings when said check link is subjected to tensile or compressive forces, said maintaining means comprising universal joints between at least one of said check link ends and said connecting means, said universal joint comprising a socket and a spherical member held therein and means for limiting the movement of said connecting means.

FOSTER V. WALTZ.